(12) United States Patent
O'Rear et al.

(10) Patent No.: US 6,992,113 B2
(45) Date of Patent: Jan. 31, 2006

(54) CONTROL OF $CO_2$ EMISSIONS FROM A FISCHER-TROPSCH FACILITY BY USE OF DUAL FUNCTIONAL SYNGAS CONVERSION

(75) Inventors: Dennis J. O'Rear, Petaluma, CA (US); Charles L. Kibby, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/720,673

(22) Filed: Nov. 25, 2003

(65) Prior Publication Data

US 2005/0113463 A1 May 26, 2005

(51) Int. Cl.
*C07C 27/00* (2006.01)

(52) U.S. Cl. .................. 518/705; 518/700; 518/707; 518/713; 518/714; 518/715

(58) Field of Classification Search ............... 518/700, 518/705, 707, 713, 714, 715
See application file for complete search history.

(56) References Cited

U.S. PATENT DOCUMENTS

| | | | |
|---|---|---|---|
| 4,279,830 A | 7/1981 | Haag et al. | |
| 4,624,968 A | 11/1986 | Kim et al. | |
| 6,169,120 B1 | 1/2001 | Beer | |
| 6,512,018 B2 * | 1/2003 | Kennedy | 518/715 |
| 6,693,138 B2 | 2/2004 | O'Rear | |
| 6,703,429 B2 | 3/2004 | O'Rear | |

FOREIGN PATENT DOCUMENTS

| | | |
|---|---|---|
| EP | 0679620 A2 | 11/1995 |
| EP | 0921184 A1 | 6/1999 |
| RU | 2089533 | 4/1994 |
| WO | 00/63141 A1 | 10/2000 |

OTHER PUBLICATIONS

Fujiwara M., et al., "Development of composite Catalyst Made of CuZnCr Oxide/[HY]Zeolite for Hydrogenation of Carbon Dioxide", *Applied Catalysis A: General* 121(1):113-24 (1995).

Souma, Y., et al., "Hydrocarbon Synthesis from CO2 Over Composite Catalysts", 4th International Carbon Dioxide Utilization Conference, Kyoto, Japan, *Studies in Surface Science and Catalysis* 114:327-32 (1998).

Fujiwara, M., et al., "Hydrogenation of Carbon Dioxide Over Cu-Zn-Cr/Zeolite Composite Catalysts: The Effects of reaction Behavior of Alkenes on Hydrocarbon Synthesis", *Applied Catalysis A* 130(1):105-116 (1995).

Inui, T., et al., "Hydrogenation of Carbon Dioxide to C1-C7 Hydrocarbons by a Methanol on Composite Catalysts", *Applied Catalysis A* 94(1):31-44 (1993).

U.S. Appl. No. 10/720,674, O'Rear et al., *Gas-to Liquid CO2 Reduction by Use of H2 as a Fuel*, filed on Nov. 25, 2003.

(Continued)

*Primary Examiner*—J. Parsa
(74) *Attorney, Agent, or Firm*—Buchanan Ingersoll PC

(57) ABSTRACT

$CO_2$ emissions from syngas conversion processes are reduced by use of a multi-stage Fischer-Tropsch reaction system. A process for the conversion of syngas using a Fischer-Tropsch reactor comprises forming a first syngas and reacting at least a portion of the first syngas in a Fischer-Tropsch reactor to form a first hydrocarbonaceous product and a second syngas. The second syngas is mixed with a hydrogen-containing stream to provide an adjusted syngas, at least a portion of which is reacted in a dual functional syngas conversion reactor to form a second hydrocarbonaceous product and a third syngas comprising a reduced amount of $CO_2$ than was present in the adjusted syngas.

17 Claims, 2 Drawing Sheets

OTHER PUBLICATIONS

U.S. Appl. No. 10/720,675, O'Rear, et al., *Control of CO2 Emissions from a Fischer-Tropsch Facility by Use of Muliple Reactors*, filed on Nov. 25, 2003.

U.S. Appl. No. 10/118,029, O'Rear, *Reducing $CO_2$ Levels in $CO_2$-Rich Natural Gases Converted into Liquid Fuels*, filed Apr. 9, 2002.

\* cited by examiner

Figure 1. Conventional Fischer Tropsch Process

CONTROL OF CO₂ EMISSIONS FROM A FISCHER-TROPSCH FACILITY BY USE OF DUAL FUNCTIONAL SYNGAS CONVERSION

BACKGROUND OF THE INVENTION

1. Field of the Invention

The present invention is directed to reducing $CO_2$ emissions from syngas conversion processes. In particular, the present invention is directed to use of a multi-stage Fischer-Tropsch reaction system to reduce $CO_2$ emissions from syngas conversion processes.

2. Description of the Related Art

The conversion of natural gas assets into more valuable products, including combustible liquid fuels, is desired to more effectively utilize these natural gas assets. The conversion of natural gas to more valuable products generally involves syngas generation. Syngas generation involves converting natural gas, which is mostly methane, to synthesis or syngas gas, which is a mixture of carbon monoxide and hydrogen. Syngas may be used as a feedstock for producing a wide range of products, including combustible liquid fuels, methanol, acetic acid, dimethyl ether, oxo alcohols, and isocyanates.

There are two main approaches to convert remote natural gas assets into conventional transportation fuels and lubricants using syngas. Natural gas may be converted into syngas followed by a Fischer Tropsch process, or natural gas may be converted into syngas followed by methanol synthesis, which is followed by a methanol to gas process (MTG) to convert methanol into highly aromatic gasoline. The syngas generation is the most costly step of these processes. A critical feature of these processes is producing syngas with a desired $H_2/CO$ ratio to optimize formation of the desired products and to avoid problems in the syngas formation step.

Syngas can be generated from three major chemical reactions. The first involves steam reforming of methane. The ratio of hydrogen to carbon monoxide, which is formed from this process, is typically approximately 3.0. A second process for syngas generation involves dry reforming of methane or the reaction between carbon dioxide and methane. An attractive feature of this method is that carbon dioxide is converted into syngas; however, this method has problems with rapid carbon deposition. The carbon deposition or coke forming reaction is a separate reaction from the one that generates the syngas and occurs subsequent to the syngas formation reactor. However, the reaction of methane in dry reforming is slow enough that long residence times are required for high conversion rates and these long residence times lead to coke formation. The ratio of hydrogen to carbon monoxide, which is formed from this process, is typically approximately 1.0. A third process for syngas generation involves partial oxidation of methane using oxygen. The ratio of hydrogen to carbon monoxide, which is formed from this process, is typically approximately 2.0. However, in commercial practice, some amount of steam is typically added to a partial oxidation reformer in order to control carbon formation and the addition of steam tends to increase the $H_2/CO$ ratio above 2.0.

It is possible to produce syngas with a $H_2/CO$ ratio that is a above the ratio ideally desired for the process in which the syngas is to be used, and then to remove excess hydrogen to adjust the ratio to the desired value. However, the $H_2$ removal process employs expensive $H_2$ separation systems that tend to foul and decline in performance with use.

The Fischer-Tropsch and MTG processes both have advantages and disadvantages. For instance, the Fischer-Tropsch process has the advantage of forming products that are highly paraffinic. Highly paraffinic products are desirable because they exhibit excellent combustion and lubricating properties. Unfortunately, a disadvantage of the Fischer-Tropsch process is that the Fischer-Tropsch process emits relatively large amounts of $CO_2$ during the conversion of natural gas assets into salable products. An advantage of the MTG process is that the MTG process produces highly aromatic gasoline and LPG fractions (e.g., propane and butane). However, while highly aromatic gasoline produced by the MTG process is generally suitable for use in conventional gasoline engines, highly aromatic MTG gasoline may be prone to form durene and other polymethyl aromatics having low crystallization temperatures that form solids upon standing. In addition, the MTG process is more expensive than the Fischer-Tropsch process and the products produced by the MTG process cannot be used for lubricants, diesel engine fuels or jet turbine fuels.

Multiple Fischer-Tropsch reactors have been used for various purposes. For example, U.S. Pat. No. 6,169,120 to Beer of Syntroleum, discloses a two-stage Fischer-Tropsch process that uses intermediate water removal. The process of Beer, however, is intended to be used for processing syngas produced from air that will contain appreciable amounts of nitrogen.

U.S. Pat. No. 4,279,830 to Haag et al. of Mobil, discloses a second zeolite-containing catalyst used to maintain a syngas composition so that a $H_2:CO$ ratio remains in a range of about 0.5 to about 1.0. Haag explains that this composition range is appropriate for Fe-based Fischer-Tropsch catalysts, but is not suitable for Co-based catalysts. Haag also explains that operating within a selective range of process conditions provides an improved process for upgrading the total effluent from a Fischer-Tropsch operation.

U.S. Pat. No. 4,624,968 to Kim et al. of Exxon, discloses a two-stage Fischer-Tropsch operation wherein specific catalysts are used for olefin synthesis and then conversion.

WO/0063141 to Clark et al. of Reema International Corp., discloses a Fischer-Tropsch process for synthesizing hydrocarbons that includes multiple Fischer-Tropsch reactor stages arranged in series. The process of Clark provides very low carbon monoxide conversion per Fischer-Tropsch reactor stage and employs intermediate removal of water between reactor stages. In one embodiment, the system uses an iron-based catalyst. Also, in a preferred embodiment, $CO_2$ is recycled from the last reactor in a series of Fischer-Tropsch reactor stages to a syngas reactor.

EP 0679 620 A2, to Long of Exxon, discloses a high conversion hydrocarbon synthesis achieved by reacting $H_2$ and CO in a first stage(s) in the presence of a non-shifting catalyst. The process further includes separating liquid products and reacting the remaining gas streams in the presence of shifting catalysts.

Additionally, the conversion of $CO_2$ into hydrocarbonaceous products using dual functional syngas conversion catalysts has been described in various references. For instance, "Development of Composite Catalyst Made of CuZnCr Oxide/[HY]Zeolite for Hydrogenation of Carbon Dioxide," Fujiwara M; Kieffer R; Ando H; Souma Y, Applied Catalysis A: General V 121 M.1 113–24 (Jan. 5, 1995); "Hydrocarbon Synthesis From $CO_2$ Over Composite Catalysts," Souma Y; Kieffer R; Fujiwara M; Ando H; Xu Q 4th International Carbon Dioxide Utilization Conference (Kyoto Japan Sep. 7–11, 1997) Studies in Surface Science and Catalysis V114 327–32 (1998); "Hydrogenation of Carbon Dioxide Over Cu—Zn—Cr/Zeolite Composite Catalysts: The Effects of Reaction Behavior of Alkenes on Hydrocarbon Synthesis," Fujiwara M; Ando H; Tanaka M; Souma Y, Applied Catalysis A: General V130 N. 1 105–16 (Sep. 14, 1995); "Hydrogenation of Carbon Dioxide to $C_1$–$C_7$ Hydrocarbons by a Methanol on Composite Catalysts," Inui T; Kitagawa K; Takeguchi T; Hagiwara T; Makino Y, Applied Catalysis A: General V94 N. 1 31–44 (Jan. 27, 1993) and "Preparation of Benzene Fractions of Hydrocarbons—Includes Using Catalysts Containing Specified Zeolite and Metal Oxide Constituent," K G Ione and V M Mysov, Ru2089533, all disclose converting $CO_2$ into hydrocarbonaceous products using dual functional syngas conversion catalysts.

Thus, while the use of multiple Fischer-Tropsch reactors is known for various purposes, until now no one has suggested using a multi-stage reactor system that employs selected catalysts to reduce $CO_2$ emissions. As a result, there is a need for processes that reduce $CO_2$ emissions from syngas conversion processes while producing desired hydrocarbonaceous products.

SUMMARY OF THE INVENTION

The present invention satisfies the above objectives by providing a process that reduces $CO_2$ emissions from syngas conversion processes by using multi-stage Fischer-Tropsch reaction systems. By using multi-stage Fischer-Tropsch reaction systems, the present invention avoids the need for costly $CO_2$ isolation processes.

The process according to the present invention, for the conversion of syngas using a Fischer-Tropsch reactor, comprises forming a first syngas and reacting at least a portion of the first syngas containing at least about 2 vol % $CO_2$ in a Fischer-Tropsch reactor to form a first hydrocarbonaceous product and a second syngas comprising at least about 2 vol % $CO_2$. Next, the process includes mixing the second syngas with a hydrogen-containing stream to provide an adjusted syngas having a molar ratio of $H_2$:$(CO+CO_2)$ of at least about 1.0. The process further includes reacting at least a portion of the adjusted syngas in a dual functional syngas conversion reactor to form a second hydrocarbonaceous product and a third syngas comprising a reduced amount of $CO_2$ than was present in the adjusted syngas.

In another embodiment, the process comprises forming a first syngas and reacting at least a portion of a blended syngas, comprising at least a portion of the first syngas and containing at least about 2 vol % $CO_2$, in a Fischer-Tropsch reactor to form a first hydrocarbonaceous product and a second syngas comprising at least about 2 vol % $CO_2$. Next, the process includes mixing the second syngas with a hydrogen-containing stream to provide an adjusted syngas having a molar ratio of $H_2$:$(CO+CO_2)$ of at least about 1.0. The process further includes reacting at least a portion of the adjusted syngas in a dual functional syngas conversion reactor to form a second hydrocarbonaceous product and a third syngas comprising a reduced amount of $CO_2$ than was present in the adjusted syngas. Finally, the process includes blending at least a portion of the third syngas with at least a portion of the first syngas to form the blended syngas.

According to a further aspect of the present invention, a Gas-to-Liquids facility includes a syngas generator that forms a first syngas and a Fischer-Tropsch reactor that reacts at least a portion of a blended syngas comprising at least a portion of the first syngas and containing at least about 2 vol % $CO_2$, to form a first hydrocarbonaceous product and a second syngas comprising at least about 2 vol % $CO_2$. The facility also includes a hydrogen source that supplies a hydrogen-containing stream that mixes with the second syngas to form an adjusted syngas. The facility also includes a dual functional syngas conversion reactor that reacts at least a portion of the adjusted syngas to form a second hydrocarbonaceous product and a third syngas comprising a reduced amount of $CO_2$ than was present in the adjusted syngas.

The process of the present invention, through the use of multiple reactors, thereby realizes an important advantage in that it substantially minimizes $CO_2$ emissions generated from a syngas conversion process without having to use costly $CO_2$ isolation processes including, but not limited to, $CO_2$ compression, liquefaction or solidification to isolate $CO_2$ from $CH_4$-containing gases.

DETAILED DESCRIPTION OF THE PREFERRED EMBODIMENTS

In the present invention, $CO_2$ emissions from a syngas conversion process are reduced by using a multi-stage Fischer-Tropsch reaction system. Syngas depleted of $CO_2$, formed as a result of the multi-stage Fischer-Tropsch reaction system, is recycled in the system, thereby reducing $CO_2$ emissions from the system. More specifically, a first syngas is reacted in a Fischer-Tropsch reactor forming a first product, containing a second syngas. The first product is separated and the second syngas is mixed with a hydrogen-containing stream to provide an adjusted syngas, at least a portion of which is reacted in a dual functional syngas conversion reactor to form a second product, containing a third syngas comprising a reduced amount of $CO_2$ than was present in the adjusted syngas. Preferably, at least a portion of the third syngas is then recycled to the Fischer-Tropsch reactor. The third syngas is blended with the first syngas and reacted in the Fischer-Tropsch reactor. As a result, the amount of $CO_2$ generated by the process is substantially reduced.

The adjusted syngas, comprising the second syngas and a hydrogen containing stream, may be formed in situ in the dual functional syngas conversion reactor. In such a case, both the second syngas and the hydrogen containing stream would be fed directly to the dual functional syngas conversion reactor.

According to the present invention, the third syngas comprises a reduced amount of $CO_2$ than was present in the adjusted syngas, meaning that the adjusted syngas has a greater total amount or quantity of $CO_2$ than does the third syngas. Therefore, although the percent concentration of $CO_2$ in the third syngas may be greater than the percent concentration of $CO_2$ in the adjusted syngas, the third syngas comprises a reduced total amount or quantity of $CO_2$.

Figure 1:
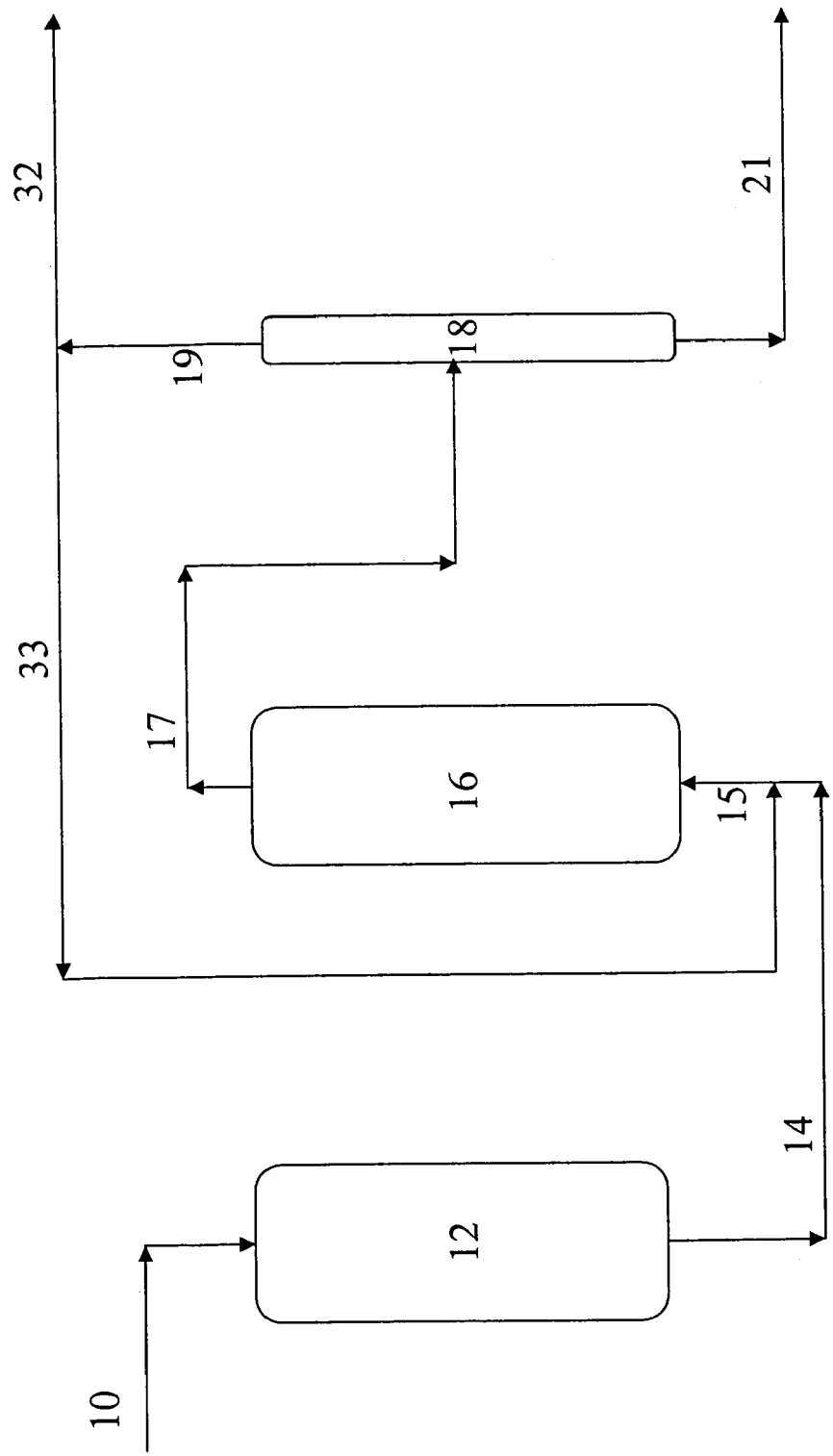
FIG. 1 is a schematic view of a conventional Fischer-Tropsch process.

Catalysts and conditions for performing Fischer-Tropsch reactions are well known to those of skill in the art, and are described, for example, in EP 0 921 184A1, the contents of which are hereby incorporated by reference in their entirety. A schematic of a conventional Fischer-Tropsch process is shown in FIG. 1.

In this process, a feedstream 10 comprising $CH_4$, $O_2$ and $H_2O$ enters a syngas generator 12. The syngas generator 12 generates syngas comprising CO, $H_2$, and $CO_2$. The syngas stream 14 exits the syngas generator 12 and enters a Fischer-Tropsch reactor 16. A product stream 17 exits the Fischer-Tropsch reactor 16 and enters a separator 18. The separator 18 separates the syngas into a hydrocarbonaceous stream 21 comprising $C_{5+}$ liquids and an unreacted gas stream 19. Separator 18 is a generalized representation of the product separation, representing one or more separation zones, some of which may be internal to the Fischer-Tropsch reactor, and some of which may be external to the Fischer-Tropsch reactor.

The unreacted gas stream 19, exiting the separator 18, can be divided into two additional streams. The first stream can be comprised of excess unreacted gas comprising CO, $H_2$ and $CO_2$. This stream exits the process in an exit stream 32, to be used as fuel. The second stream, also comprising unreacted CO, $H_2$, and $CO_2$, can be recycled to be mixed with the syngas stream 14, exiting the syngas generator 12, before entering the Fischer-Tropsch hydrocarbon reactor 16 to produce a mixed syngas stream 15.

The Fischer-Tropsch process can be understood by examining the stoichiometry of the reaction that occurs during a Fischer-Tropsch process. For example, during Fischer-Tropsch processing, syngas (i.e., a mixture including $CO_2$ and hydrogen) is generated, typically from at least one of three basic reactions. Typical Fischer-Tropsch reaction products include paraffins and olefins, generally represented by the formula $nCH_2$. While this formula accurately defines mono-olefin products, it only approximately defines $C_{5+}$ paraffin products. The value of n (i.e., the average carbon number of the product) is determined by reaction conditions including, but not limited to, temperature, pressure, space rate, catalyst type and syngas composition. The desired net syngas stoichiometry for a Fischer-Tropsch reaction is independent of the average carbon number (n) of the product and is about 2.0, as determined by the following reaction equation:

$$nCO + 2nH_2 \rightarrow nH_2O + C_nH_{2n+2}$$

where $C_nH_{2n+2}$ represents typical Fischer-Tropsch reaction products such as, for example, olefins and paraffins.

The three general reactions that produce syngas from methane are as follows:

1. steam reforming of methane: $CH_4 + H_2O \rightarrow CO + 3H_2$;
2. dry reforming, or reaction between $CO_2$ and methane: $CH_4 + CO_2 \rightarrow 2CO + 2H_2$; and
3. partial oxidation using oxygen: $CH_4 + \frac{1}{2}O_2 \rightarrow CO + 2H_2$.

Although the above general reactions are the basic reactions used to produce syngas, the ratio of hydrogen to carbon monoxide produced by the above reactions is not always adequate for the desired Fischer-Tropsch conversion ratio of 2.0. For example, in the steam reforming reaction, the resulting ratio of hydrogen to carbon monoxide is 3.0, which is higher than the desired hydrogen to carbon monoxide ratio of 2.0 for a Fischer-Tropsch conversion. Similarly, in the dry reforming reaction, the resulting hydrogen to carbon monoxide ratio is 1.0, which is lower than the desired hydrogen to carbon monoxide ratio of 2.0 for a Fischer-Tropsch conversion. In addition to exhibiting a hydrogen to carbon monoxide ratio that is lower than the desired ratio for a Fischer-Tropsch conversion, the above dry reforming reaction also suffers from problems associated with rapid carbon deposition. Finally, because the above partial oxidation reaction provides a hydrogen to carbon monoxide ratio of 2.0, the partial oxidation reaction is the preferred reaction for Fischer-Tropsch conversions.

In commercial practice, an amount of steam added to a partial oxidation reformer can control carbon formation. Likewise, certain amounts of $CO_2$ can be tolerated in the feed. Thus, even though partial oxidation is the preferred reaction for Fischer-Tropsch conversions, all of the above reactions can occur, to some extent, in an oxidation reformer.

During partial oxidation, $CO_2$ forms because the reaction is not perfectly selective. That is, some amount of methane in the reaction will react with oxygen to form $CO_2$ by complete combustion. The reaction of methane with oxygen to form $CO_2$ is generally represented by the following reactions:

$$CH_4 + O_2 \rightarrow CO_2 + 2H_2$$

and $$CH_4 + 2O_2 \rightarrow CO_2 + 2H_2O.$$

Furthermore, steam added to the reformer to control coking, or steam produced during the Fischer-Tropsch reaction can react with CO to form $CO_2$ in a water gas shift reaction represented by the following general reaction:

$$CO + H_2O \rightarrow CO_2 + H_2.$$

Thus, invariably a significant amount of $CO_2$ is formed during the conversion of methane into transportation fuels and lubricants by the Fischer-Tropsch process. The $CO_2$ produced during the Fischer-Tropsch process exits the Fischer-Tropsch/Gas-To-Liquid (GTL) process in a tail gas exiting a Fischer-Tropsch facility. Tail gases exiting a Fischer-Tropsch/GTL process comprise any gases that remain unconsumed by the Fischer-Tropsch process.

The above equations represent general stoichiometric equations, and do not reflect an optimum syngas composition for the kinetics or selectivity of a Fischer-Tropsch reaction. Moreover, depending on the nature of the Fischer-Tropsch catalyst, syngas ratios other than about 2.0, typically less than about 2.0, are used to prepare the feed to a Fischer-Tropsch facility. However, because Fischer-Tropsch facilities typically produce products exhibiting a hydrogen to carbon ratio of about 2.0, the limiting reagent, typically $H_2$, is consumed first. The extra reagent, typically CO, is then recycled back to the Fischer-Tropsch facility for further conversion. Syngas compositions having hydrogen to carbon ratios other than about 2.0 are typically generated by recycling unused reagents.

In order to control the reaction, Fischer-Tropsch processes operate at less than about 100% conversion of the CO in the syngas. Typically, Fischer-Tropsch processes are operated at between about 40% and about 70% conversion per pass. In Fisher-Tropsch processes that use $O_2$ (typically about 99.5% purity), rather than air, unreacted syngas is recycled to the Fischer-Tropsch process.

From the standpoint of economics and operational efficiency, a preferred Fischer-Tropsch process uses a catalyst in a slurry bed-type reactor. Also, from a practicality standpoint, the most common catalysts, for use in slurry bed units, contain cobalt. Cobalt does not promote a water gas shift reaction, or the reverse of such a reaction. In these units, $CO_2$ is, for the most part, an inert gas. As $CO_2$ is recycled to a Fischer-Tropsch reactor, the concentration of $CO_2$ increases. The increase in $CO_2$ concentration effectively lowers the concentration of reactive syngas components including, but not limited to, CO and $H_2$. As a result, the rate of reaction can be substantially reduced.

To compensate for lower partial pressures of the reactive components, the pressure of a Fischer-Tropsch reactor can be increased. During recycling, a small amount of $CO_2$ in the initial syngas, typically about 5 vol % but always at least about 2 vol %, can be increased to much larger values such as, for example, about 40 vol %. In commercial practice, a portion of the $CO_2$-enriched recycled gas is typically recycled to a syngas generator where it promotes a dry reformation reaction and reduces the ratio of $H_2$:CO in the syngas to a desired level. However, much more $CO_2$ is produced than can be consumed in the syngas generator. As a result, excess $CO_2$-enriched recycle gas is purged from the process and used as a low-energy-content fuel. The use of this low-energy-content fuel is a significant source of $CO_2$ emissions from the syngas conversion process.

In the processes of the present invention, $CO_2$ emissions are reduced by first reacting a by-product unreacted gas (i.e., a second syngas, produced from a first Fischer-Tropsch reactor) in a dual functional syngas conversion reactor with added hydrogen to produce a third syngas having a reduced $CO_2$ content, compared to the second syngas generated from the Fischer-Tropsch reactor. The added hydrogen mixes with the by-product unreacted gas (i.e. second syngas) at least one of before, during or after entering the dual functional syngas conversion reactor.

Preferably, a portion of the third syngas can be recycled to the Fischer-Tropsch reactor for additional processing to further reduce $CO_2$ emissions. That is, at least a portion of the third syngas can be recycled to mix with the first syngas to produce a blended syngas at least one of before, during or after entering the Fischer-Tropsch reactor.

Also, the hydrocarbonaceous products formed by the Fischer-Tropsch and the dual functional syngas conversion reactors can be combined to form a blended hydrocarbonaceous product. By blending the hydrocarbonaceous products to obtain a blended hydrocarbonaceous product, the present invention can substantially minimize or eliminate the need for further distillation and/or upgrading. As a result, the present invention is less costly and more efficient than conventional hydrocarbon product synthesis. Since the products from the dual functional syngas conversion reactor are rich in aromatics, they will more closely resemble products from a naphtha reformer than products from the Fischer-Tropsch reactor.

The hydrocarbonaceous products can be blended using any suitable means for blending including, but not limited to, mixers, blenders, agitators and stirrers including, for example, those described in Section 18 of Perry's Chemical Engineer's Handbook, Seventh Edition (1997), the disclosure of which is hereby incorporated by reference in its entirety. Blending can be accomplished in a variety of ways commonly known to those of still in the art. By way of example, blending may be accomplished by sending the products to a common distillation unit or separator.

The hydrogen mixed with the second syngas can be recovered from any number of sources in the process. For instance, suitable sources include, but are not limited to, syngas, $C_6$–$C_{10}$ naphtha reformation, unreacted hydrogen from hydroprocessing a $C_{10+}$-containing feedstock, unreacted gas streams from the syngas conversion unit, gas streams associated with a hydrotreater/hydrocracker used to upgrade the product, gas streams associated with a naphtha reformer used to make aromatic product, steam reforming of methane, combinations thereof and the like. With regard to steam reforming of methane as a source of hydrogen, a steam reforming reactor may be needed to produce hydrogen for upgrading of $C_{10+}$ product, via hydrotreating and hydrocracking. The hydrogen can be recovered using any number of conventional hydrogen recovery processes including, but not limited to, adsorption, absorption, cryogenic separation, membrane separation, combinations thereof and the like. While one or more recovery processes may be needed to recover hydrogen from syngas or tail gas, by-product gas from a naphtha reformer or $C_{3+}$ product upgrader will not contain appreciable amounts of CO or $CO_2$ and thus may not need any recovery process except for condensation of heavy hydrocarbons ($C_{6+}$). Additionally, although it is preferable to use recovered hydrogen, it is also possible to replace and/or supplement recovered hydrogen with hydrogen obtained from alternate sources. $CO_2$ is a by-product of steam reforming. Since this $H_2$-containing steam will be reacted with $CO_2$ from other sources, it is not essential that the $CO_2$ (or CO) be removed from it prior to reaction. If $CO_2$ and CO removal are needed from the portion of the $H_2$ intended for upgrading of the $C_{10+}$ product, this recovered $CO_2$ and CO can be reacted along with the other sources of $CO_2$.

Membrane separators are expensive to build and operate, thus routes that do not require membrane separators have lower capital costs and are preferred. Accordingly, a preferred embodiment of the present invention relies on syngas formation comprising partial oxidation, as such processes do not require membrane separation to obtain a hydrogen rich gas stream. Further, deriving hydrogen rich gas streams from upgrading process steps such as naphtha reforming, which generates hydrogen as a by-product, does not require the use of membrane separations to recover the hydrogen. In these processes, rather, condensation of heavy hydrocarbons ($C_{6+}$) alone may allow recovery of hydrogen.

The Fischer-Tropsch reactor can be any suitable reactor including, but not limited to, a slurry bed reactor, a fixed bed reactor, a fluidized bed reactor, combinations thereof and the like. In preferred embodiments, the Fischer-Tropsch reactor is a slurry bed reactor that uses a cobalt catalyst. Additionally, in preferred embodiments, the process conditions and the catalysts are selected so that the water gas shift reaction is not promoted to an appreciable extent.

The dual functional syngas reactors of the present invention include reactors that use conversion catalysts containing at least one element capable of synthesizing methanol such as, for example, Zn, Cr, Cu, and an acidic component such as, for example, a zeolite (e.g., ZSM-5) that immediately converts essentially all methanol into hydrocarbonaceous product. ZSM-5 is a zeolite with an MFI structure defined, for example, by the Structure Commission of the International Zeolite Association. Thus, the dual functional reactors of the present invention synthesize methanol and then convert it into hydrocarbonaceous product.

In addition to minimizing $CO_2$ emissions, the present invention also provides the added advantage of improving the conversion of syngas into valuable hydrocarbonaceous products. The syngas used in the processes of the present invention can be obtained from various suitable sources including, but not limited to, $CH_4$, coal, hydrocarbonaceous products, combinations thereof and the like. Syngas derived from a combination of the above sources can be obtained using a syngas generator.

In addition, it should be recognized that not all syngas generated from the Fischer-Tropsch reactor needs to be processed in a dual functional syngas conversion reactor. Because $CO_2$ builds up slowly and because reasonable concentrations of $CO_2$ can be tolerated such as, for example, less than about 60 mol %, only a portion of the syngas needs to be processed in the second reactor to achieve a desired $CO_2$ conversion. As a result, the size of the dual functional syngas conversion reactor can be relatively small.

In certain circumstances, it is undesirable to process syngas from the Fischer-Tropsch reactor and then recycle the $CO_2$-depleted syngas to the first reactor. It has been surprisingly discovered that a reduction in $CO_2$ emissions can also be achieved by using a portion of the unreacted syngas from a Fischer-Tropsch reactor as a feed to a dual functional syngas conversion reactor.

Water is a natural product of a syngas generator, a Fischer-Tropsch reactor and a dual functional syngas conversion reaction. Accordingly, it is preferable that water be removed from the reactors and separated from the products produced by the reactors. If water is not removed, the water can promote undesirable reverse water gas shift reactions that can convert CO into additional $CO_2$.

It should be recognized that $CO_2$ recycled to the Fischer-Tropsch reactor serves a useful purpose. That is, $CO_2$ recycled to the Fischer-Tropsch reactor serves as a diluent for reactive syngas components such as, for example, $H_2$ and CO. Inert $CO_2$ acts to dissipate heat generated during operation and can improve process control. As $CO_2$ is consumed by the dual functional syngas conversion reactor, other inert gas components build up in the recycled gas. These inert components can include methane, $N_2$, Ar and other inert gas elements. Methane components can originate from unconverted methane in the syngas generator and methane formation that occurs in the Fischer-Tropsch reactor. The $N_2$, Ar and other inert gas elements can be generated from an air separation unit or may also be obtained from an original natural gas feedstock. Normally, $CO_2$ is the most abundant inert gas component. However, when $CO_2$ is removed, in accordance with processes of the present invention, the concentration of other inert gas components can increase. These other inert gas components can act as a substitute for the removed $CO_2$ to improve management of heat released in the Fischer-Tropsch reactor. As a result, more of the carbon (as carbon monoxide) in the recycled gas can be processed. The increased processing of carbon (as carbon monoxide) improves overall carbon efficiency as does the direct conversion of $CO_2$ to products in the dual functional syngas conversion reactor. Carbon efficiency is defined as the ratio of $C_{3+}$ products to feed methane in the process. However, because of the increased concentration of other inert gas components, it may eventually be necessary to purge the other inert gas components from the system to be used in other applications, thereby producing a methane-enriched gas. In normal operation, the purged gas is rich in $CO_2$ and has a low heating value making its use limited. However, according to the present invention, the purged gas will be depleted in $CO_2$ and enriched in other gases, typically methane, thus increasing its heating value and uses.

In the gas recycle operation, the composition of the blended syngas to the Fischer-Tropsch reactor can change as the dual functional syngas conversion reactor converts $CO_2$ into other products. Generally, although the concentration of other inert gas components increases, the concentration of reactive syngas components remains essentially constant. The blended syngas obtained is a mixture of fresh syngas, generated from the syngas generator, and recycled syngas that is recycled from the separator. The following table provides typical ranges of syngas compositions for a process that generates syngas from an oxygen source having a purity level of about 99.5%.

| Component, mol % | Typical FT Unit without $CO_2$ conversion | With low level of $CO_2$ conversion | With moderate level of $CO_2$ conversion | With high level of $CO_2$ conversion |
| --- | --- | --- | --- | --- |
| $H_2$ | 30 | 30 | 30 | 30 |
| CO | 40 | 40 | 40 | 40 |
| $CO_2$ | 20 | 15 | 10 | 5 |
| $N_2$ + Ar | 2 | 3 | 4 | 6 |
| $C_{1+}$ Hydrocarbons | 8 | 12 | 16 | 19 |

In order to control $CO_2$ emissions, operating conditions in the dual functional syngas conversion reactor should be approximately as follows:

| Variable | Broad | Preferred |
| --- | --- | --- |
| Pressure, Atmospheres | 25–100 | 35–75 |
| Temperature, °C. | 300–500 | 375–425 |
| CO + $CO_2$ conversion, % | 20–80 | 30–50 |
| $H_2$: (CO + $CO_2$) ratio | 1.25–3.0 | 1.5–1.75 |

Dual functional syngas conversion catalysts for first converting $CO_2$ to methanol include, but are not limited to, metals or oxides of, for example, zinc, iron, cobalt, nickel, ruthenium, thorium, rhodium, osmium, modifications thereof, combinations thereof and the like.

Dual functional syngas conversion catalysts include an acidic component to convert the methanol to hydrocarbonaceous products, typically one or more zeolites and/or non-zeolitic molecular sieves. Additionally, suitable dual functional syngas conversion catalysts can include strong solid acids. Zeolites that are relatively acidic tend to produce more aromatics, while those that are relatively non-acidic tend to form more iso-paraffins.

In instances where a dual functional syngas conversion catalyst includes a zeolite, in addition to the transition metal component, the properties of the zeolite determine the nature of the product of the reaction. When the zeolite becomes acidic, hydrogen transfer occurs. Hydrogen transfer converts some of the higher molecular weight hydrocarbon fragments into aromatics. The hydrogen generated from this reaction is not released into the gas phase as molecular $H_2$, but instead is transferred to lower molecular weight olefins. The lower molecular weight olefins are then converted into less valuable LPG. In addition, hydrogen from the aromatics can reduce CO to methane. Therefore, products from a dual functional syngas conversion process using an acidic catalyst include aromatic-rich gasoline and light gases. The production of less valuable light gases negates the production of more valuable gasoline, or petrochemical grade aromatics.

If the acidity of the zeolite is reduced, however, hydrogen transfer is reduced and the hydrocarbons continue to grow into the jet and diesel range rather than being converted to aromatics. Also, since hydrogen transfer is reduced, light gas production is also reduced. Previous studies have demonstrated that if the acidity of the zeolite is reduced, gas production and product aromatics are reduced and a very high proportion of iso-paraffins is produced.

The hydrogen used in the dual functional syngas conversion reactor need not contain essentially no impurities such as hydrocarbons, inert gases, nitrogen, and light alcohols, but rather should contain >50% hydrogen. Unlike Fischer-Tropsch catalyst which is readily poisoned by sulfur, the dual functional syngas conversion catalyst is somewhat more tolerant.

Figure 2:
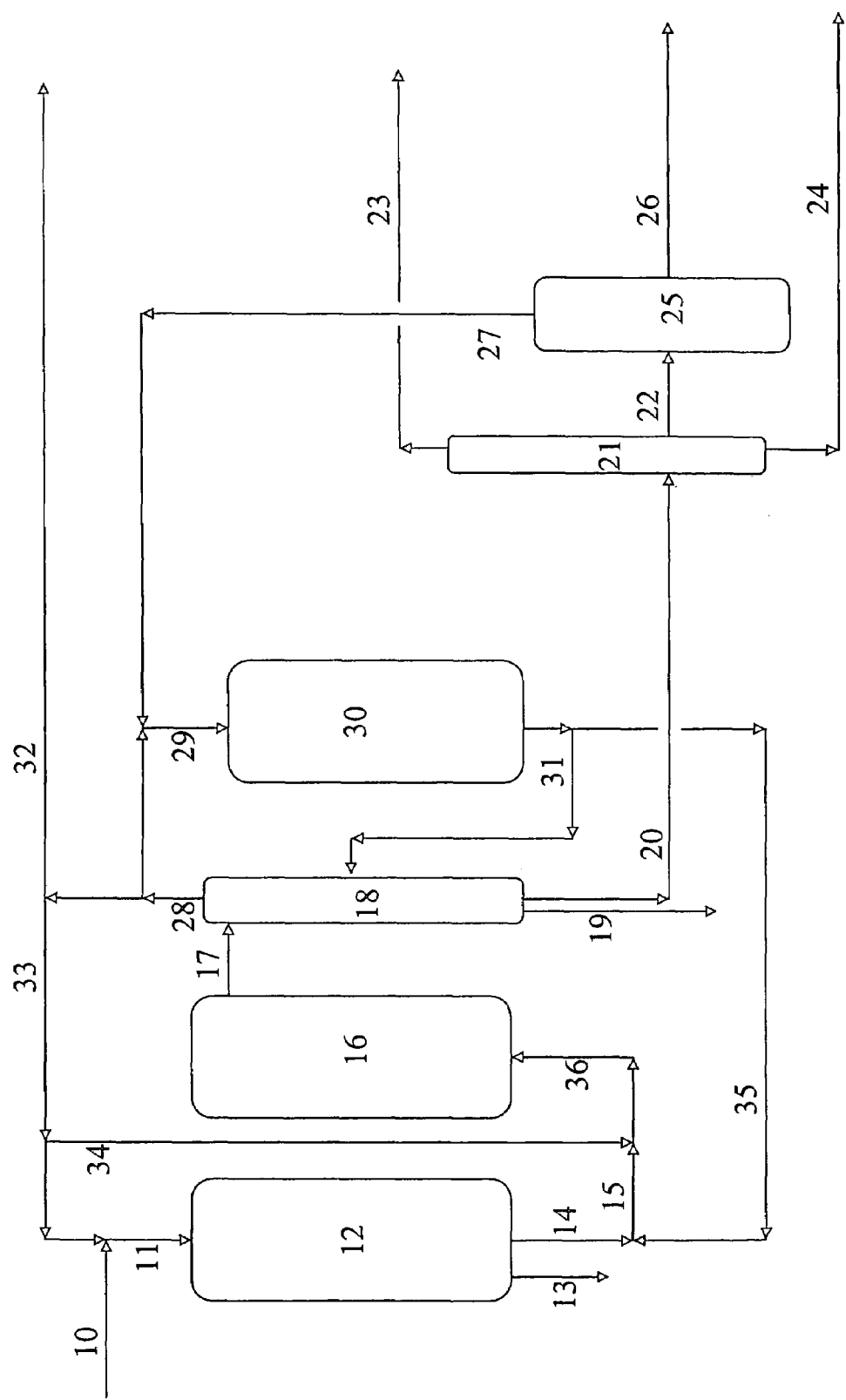
FIG. 2 is a schematic view of a preferred embodiment of a Fischer-Tropsch process according to the present invention.

A preferred embodiment of a syngas conversion process, according to the present invention, is depicted in FIG. 2. In this embodiment, a feed stream 10 comprising $CH_4$, $O_2$ and $H_2O$ enters a syngas generator 12. The syngas generator 12 generates water and a first syngas. The water exits the syngas generator 12 in a water stream 13, and the first syngas exits the syngas generator 12 in a first syngas stream 14. The first syngas stream 14 enters a first Fischer-Tropsch reactor 16. A Fischer-Tropsch hydrocarbon synthesis reaction is conducted in the first Fischer-Tropsch reactor 16 producing a first hydrocarbonaceous product and unreacted syngas (i.e., a second syngas).

The first hydrocarbonaceous product and the second syngas exit the Fischer-Tropsch reactor 16 in a first product stream 17. The first product stream 17 enters a first separator 18 wherein the first product stream 17 is separated into water, unreacted gas and a hydrocarbonaceous product stream. Water exits the first separator 18 in a water stream 19. Unreacted gas exits the separator 18 in an unreacted gas stream 28, and hydrocarbonaceous product leaves the separator 18 in a product stream 20 comprised of hydrocarbonaceous products including $C_{5+}$ liquids.

The product stream 20 enters a second separator 21 wherein the hydrocarbonaceous products are separated into $C_1$–$C_5$ product, having a H:C ratio near about 2.0, naphtha, and a $C_{10+}$ containing product with a H:C ratio near about 2.0. The $C_1$–$C_5$ product exits the second separator 21 in a $C_1$–$C_5$ product stream 23. The naphtha exits the second separator 21 in a naphtha stream 22. The $C_{10+}$ containing product exits the second separator 21 in a $C_{10+}$ product stream 24. The naphtha stream 22 enters naphtha reformer 25 wherein a $C_6$–$C_{10}$ product, having a H:C ratio less than about 2.0 is produced. The C6–$C_{10}$ product, having a H:C ratio below about 2.0, exits the reformer 25 in a product stream 26. During naphtha reformation hydrogen is produced. Hydrogen exits the naphtha reformer 25 in a hydrogen recycle stream 27. The hydrogen recycle stream 27 mixes with a portion of the unreacted gas stream 28, generated by the first separator 18, before entering a dual functional syngas conversion reactor 30, thereby producing a mixed gas stream 29 (i.e., an adjusted syngas).

The mixed gas stream 29 enters the dual functional syngas conversion reactor 30 wherein a third syngas and a second hydrocarbonaceous product are produced. The third syngas and second hydrocarbonaceous product exit the dual functional syngas conversion reactor 30 in a second product stream 31. The second product stream 31 is then directed into the first separator 18. In addition to being mixed with recycled hydrogen generated during naphtha reformation, a portion of the unreacted gas stream 28 exits the process to be used as fuel. This portion of the unreacted gas stream 28 comprises excess CO, $H_2$ and $CO_2$, and exits the process in an excess gas stream 32. At least a portion of the third syngas in the second product stream 31 is directed in a stream 35 to be blended with the first syngas stream 14, producing a blended syngas stream 15. Additionally, another portion of the unreacted gas stream 28 is recycled in a syngas recycle stream 33. The syngas recycle stream 33, mixes with the feed gas stream 10 producing a mixed feed gas stream 11 that enters the syngas generator 12. Also, a portion of the syngas recycle stream 33 can be directed in a stream 34 that mixes with the blended syngas stream 15, producing a mixed syngas stream 36 that is introduced into the Fischer-Tropsch reactor 16.

While the embodiment depicted in FIG. 2 comprises a single Fischer-Tropsch reactor and a single dual functional syngas conversion reactor, embodiments of the present invention can include additional Fischer-Tropsch reactors and/or dual functional syngas conversion reactors. For instance, it may be desirable to include additional reactors and/or conversion reactors to obtain even greater reductions in $CO_2$ emissions.

EXAMPLE

In initial operation of the following example, a first syngas is fed to a Fischer-Tropsch reactor. A second syngas is recovered from the Fischer-Tropsch reactor and fed to a dual function syngas conversion reactor. A third syngas is recovered from the dual function syngas conversion reactor. This third syngas may then be blended with the first syngas to form a blended syngas, which would be fed into the Fischer-Tropsch reactor.

A "first syngas" represents a syngas product from a syngas generator. A "blended syngas" represents a syngas made by combining the first syngas and a syngas containing a third syngas. A "second syngas" represents a syngas product from a Fischer-Tropsch reactor that comprises unreacted syngas. An "adjusted syngas" represents the second syngas-containing stream after hydrogen has been added to achieve a $H_2$:(CO+$CO_2$) molar ratio of greater than about 1.0, preferably between about 1.25 and about 3.0. A "third syngas" represents a syngas product from a dual function syngas conversion unit that comprises unreacted adjusted syngas.

In this example, a first syngas is formed from methane by reactions that include partial oxidation in a syngas generator. The oxygen used in the first syngas formation has a purity of about 99.5 vol %. The first syngas from the syngas generator contains about 5 vol % $CO_2$. Water produced in the syngas generator is separated from other components and is disposed of. The first syngas may be blended with a third syngas as well as unreacted gas from the Fischer-Tropsch reactor, forming a mixed syngas. The mixed syngas has a $CO_2$ content of about 10 vol %. The mixed syngas is processed in a Fischer-Tropsch reactor using a cobalt-containing catalyst in a slurry bed. The second syngas, contained in the products from the Fischer-Tropsch reactor, has a higher $CO_2$ content, when expressed on a basis of $C_{3-}$ and lower molecular weight species including inerts, than was present in the blended syngas.

Gas and liquid products from the Fischer-Tropsch reactor are sent to a separation complex that consists of API separators, distillation columns and other standard equipment. With a slurry bed reactor, effluent leaves the reactor as two or more streams, wherein at least one stream is a vapor and one stream is a liquid. The vapor stream leaving the Fischer-Tropsch reactor contains the second syngas. The streams produced by the separation complex include water, hydrocarbonaceous products and unreacted syngas. Because a separation complex is needed for both the products from the Fischer-Tropsch and the dual functional syngas conversion reactors, a single separation complex may be used for both reactors.

A portion of the third syngas is blended with the first syngas, from the syngas generator, producing a blended syngas stream, which can then be mixed with a portion of the unreacted syngas from the separator forming a mixed syngas. The mixed syngas is then processed in the Fischer-Tropsch reactor.

A portion of the syngas from the separator that contains the second syngas, along with some of the third syngas, is mixed with $H_2$, produced later in the process, to produce an adjusted syngas having a $H_2:(CO+CO_2)$ ratio of about 1.6. The syngas is then processed in a dual functional syngas conversion reactor. The third syngas, contained in the products from the dual functional syngas conversion reactor, has a lower $CO_2$ content when expressed on a basis of CO, $H_2$ and $CO_2$, than was present in the syngas feed to the dual functional syngas conversion reactor. The $CO_2$ conversion in the dual functional syngas conversion reactor is about 40% and the temperature and pressure used during the conversion are about 400° C. and about 60 atmospheres, respectively.

The effluent from the dual functional syngas conversion reactor is sent to the separation complex. The hydrocarbonaceous product from the separation complex is further separated, providing a $C_5$-product, a $C_6$–$C_{10}$-containing product and a $C_{10+}$-containing product. The $C_{10+}$-containing product is converted into products including, but not limited to, a diesel fuel having a H:C molar ratio of about 2.0 or greater. The $C_6$–$C_{10}$-containing product is reformed to produce an aromatic product, having a H:C molar ratio of less than about 2.0, and $H_2$. The $H_2$ is recycled to the dual functional syngas conversion reactor wherein it is used to convert the $CO_2$.

While the present invention has been described with reference to specific embodiments, this application is intended to cover those various changes and substitutions that may be made by those of ordinary skill in the art without departing from the spirit and scope of the appended claims.

What is claimed is:

1. A process for the conversion of syngas using a Fischer-Tropsch reactor, the process comprising:
   a) forming a first syngas;
   b) reacting at least a portion of the first syngas containing at least about 2 vol % $CO_2$ in a Fischer-Tropsch reactor to form a first hydrocarbonaceous product and a second syngas comprising at least about 2 vol % $CO_2$;
   c) mixing the second syngas with a hydrogen-containing stream to provide an adjusted syngas having a molar ratio of $H_2:(CO+CO_2)$ of at least about 1.0; and
   d) reacting at least a portion of the adjusted syngas in a dual functional syngas conversion reactor to form a second hydrocarbonaceous product and a third syngas comprising a reduced amount of $CO_2$ than was present in the adjusted syngas.

2. The process of claim 1, wherein at least a portion of the third syngas is used as a fuel in the process.

3. The process of claim 1, wherein the Fischer-Tropsch reactor is a reactor selected from the group consisting of a slurry bed reactor, a fixed bed reactor, a fluidized bed reactor and combinations thereof.

4. The process of claim 1, wherein the Fischer-Tropsch reactor is a slurry bed reactor comprising a Fischer-Tropsch catalyst that comprises cobalt.

5. The process of claim 1, wherein the dual functional syngas conversion reactor comprises a catalyst comprising at least one element selected from the group consisting of copper, chromium, zinc, and combinations thereof.

6. The process of claim 5, wherein the catalyst comprises a zeolite.

7. The process of claim 6, wherein the zeolite has an MFI structure.

8. The process of claim 1, wherein the adjusted syngas has a molar ratio of $H_2:(CO+CO_2)$ between about 1.25 and about 3.0.

9. The process of claim 1, wherein the dual functional syngas conversion reactor is operated under conditions including a temperature between about 300° C. and about 500° C. and a pressure between about 25 atmospheres and about 100 atmospheres.

10. The process of claim 9, wherein the temperature is between about 375° C. and about 425° C. and the pressure is between about 35 atmospheres and about 75 atmospheres.

11. The process of claim 1, wherein $CO_2$ conversion in the dual functional syngas conversion reactor is between about 20% and about 80%.

12. The process of claim 1, wherein the hydrogen-containing stream mixed with the second syngas is obtained from a source selected from the group consisting of $C_6$–$C_{10}$ naphtha reformation, unreacted hydrogen from hydroprocessing a $C_{10+}$-containing feedstock, syngas and combinations thereof.

13. The process of claim 1, further comprising recovering hydrogen for use in the hydrogen-containing stream by using a recovery process selected from the group consisting of adsorption, absorption, cryogenic separation, membrane separation and combinations thereof.

14. The process of claim 1, wherein the hydrogen-containing stream mixes with the second syngas at least one of before, during or after entering the dual functional syngas reactor.

15. A process for the conversion of syngas using a Fischer-Tropsch reactor, the process comprising:
   a) forming a first syngas;
   b) reacting at least a portion of a blended syngas, comprising at least a portion of the first syngas and containing at least about 2 vol % $CO_2$, in a Fischer-Tropsch reactor to form a first hydrocarbonaceous product and a second syngas comprising at least about 2 vol % $CO_2$;
   c) mixing the second syngas with a hydrogen-containing stream to provide an adjusted syngas having a molar ratio of $H_2:(CO+CO_2)$ of at least about 1.0;
   d) reacting at least a portion of the adjusted syngas in a dual functional syngas conversion reactor to form a second hydrocarbonaceous product and a third syngas comprising a reduced amount of $CO_2$ than was present in the adjusted syngas; and
   e) blending at least a portion of the third syngas with at least a portion of the first syngas to form the blended syngas.

16. The process of claim 15, wherein the blended syngas has a $CO_2$ content of about 15 vol % or less.

17. The process of claim 16, wherein the $CO_2$ content is about 10 vol % or less.

* * * * *